United States Patent [19]
Wernberg

[11] Patent Number: 4,913,032
[45] Date of Patent: Apr. 3, 1990

[54] MULTIPLEXED HYDRAULIC CONTROL SYSTEMS

[75] Inventor: Donald F. Wernberg, Rockford, Ill.

[73] Assignee: Woodward Governor Company, Rockford, Ill.

[21] Appl. No.: 286,040

[22] Filed: Dec. 19, 1988

[51] Int. Cl.$^4$ .............................................. F15B 13/16
[52] U.S. Cl. .................................... 91/361; 91/527; 91/536; 91/459; 137/596.17; 137/637.4
[58] Field of Search ................. 91/459, 361, 365, 521, 91/522, 524, 527, 528, 529, 530, 534, 535, 536, 461; 137/596, 596.17, 637.4

[56] References Cited

U.S. PATENT DOCUMENTS

| | | |
|---|---|---|
| 685,510 | 10/1901 | Flint .............................. 137/637.4 X |
| 3,645,141 | 2/1972 | Moore et al. . |
| 3,747,472 | 7/1973 | Knutson ............................. 91/529 X |
| 4,026,396 | 5/1977 | Hubl et al. .................... 137/637.4 X |
| 4,191,215 | 3/1980 | Gonner . |
| 4,271,867 | 6/1981 | Milberger et al. . |
| 4,325,127 | 4/1982 | Major . |
| 4,595,036 | 6/1986 | Johnston ........................ 137/596 X |
| 4,622,998 | 11/1986 | Kussel et al. ...................... 91/529 X |
| 4,638,720 | 1/1987 | McKee et al. ..................... 91/529 X |
| 4,664,136 | 5/1987 | Everett . |
| 4,712,173 | 12/1987 | Fujwara et al. .................. 91/361 X |
| 4,838,145 | 6/1989 | Slocum et al. ......................... 91/536 |

FOREIGN PATENT DOCUMENTS 1259163 1/1968 Fed. Rep. of Germany ... 137/637.4

OTHER PUBLICATIONS

"Imagine ... A Self-Calibrating Pressure Transducer", advertisement for Scanivalve Corp., San Diego, California.
"Metering Valve W/Regulator", article, Tech Data South Bend Controls Inc. Bulletin, PV-210, SBC, 1987.
"Metering Valve" article, Tech Data South Bend Controls Inc. Bulletin, PV-211, SBC, 1987.

Primary Examiner—Edward K. Look
Attorney, Agent, or Firm—Leydig, Voit & Mayer

[57] ABSTRACT

A time division multiplexed (TDM) hydraulic control system having a plurality of channels, each channel having a servo actuator. Electrical demand signals are arranged in TDM sequence and applied to a pilot valve so that the pilot valve produces a plurality of hydraulic signals. The hydraulic signals in turn are coupled to a separate commutator which distributes the hydraulic signals to the associated channels. The pilot valve is arranged with a full annular output port to maximize the port area and thereby the flow rate to the channels. The commutator size and port area is coordinated to that of the pilot valve to minimize pressure drop across the commutator and to maximize flow rate to the channels.

21 Claims, 6 Drawing Sheets

MULTIPLEXED HYDRAULIC CONTROL SYSTEMS

This invention relates to hydraulic control systems, and more particularly to systems in which a plurality of hydraulic actuators are to be precisely positioned in dependence on the magnitude of a similar plurality of electrical control signals.

There are numerous such control systems, and this invention would represent a significant advantage in connection with many of them. One exemplary and very significant application of such controls is in aircraft systems where hydraulic controls are provided for adjusting mechanical variables in jet aircraft engines. The gas turbine engines which are used to power conventional jet aircraft have commonly used hydraulic actuators for control of air valves, fuel valves, engine variable geometry, and the like. As engine designers attempt to achieve more and more performance from the gas turbine, the number of hydraulic actuators has increased significantly, and may approach 17 in number. Even gas turbine engines used on older commercial aircraft typically have on the order of six hydraulic actuators. In many cases, the actuators control functions which are critical, such as fuel supply, and on such critical functions, if control is lost, so is the engine.

Heretofore, each hydraulic actuator was provided with a device to convert an electrical input signal into a mechanical position of the actuator. Most typically, that had been done with a torque motor connected to and driving a hydraulic servo valve; the servo valve, in turn, controlled the supply of hydraulic fluid to the actuator. Both torque motors and servo valves are fairly expensive, and both are fairly weighty components, particularly for aircraft applications where weight savings on the order of pounds can translate into substantial operating cost savings over the life of the aircraft.

Applicants are aware of a concept having been proposed to reduce weight and cost in such systems, by using a single pilot valve multiplexed among a plurality of actuators. In substance, the pilot valve has a spool which is rotated for multiplexing and which is positioned vertically by a torque motor to establish control positions. The spool and valve would be modified to provide a plurality of ports at different angular positions of the spool such that the vertical control position of the valve combined with a plurality of angular multiplex positions could be used to sequentially deliver hydraulic fluid to a plurality of actuators.

This prior concept, as applicants understand it, is schematically illustrated in FIGS. 1-4 of the drawings. As best shown in FIG. 1, the valve has a valve body 20 in which a spool 21 is mounted for reciprocation and rotation. The valve body has a high pressure inlet supply port 22, a sump port 23 and an outlet port 24. The outlet port is coupled to a servo actuator 25 for controlling the position thereof. The position of the spool 21 within the valve body is controlled by a linear actuator shown herein as torque motor 26 driven by electrical signals received on a bus 27 from a microprocessor 28. The microprocessor has coupled as inputs thereto a plurality of signals 29, one for each of the channels, and a feedback signal on line 30 taken from a position sensor 31 connected to the actuator 25. A further position sensor 31a monitors the angular position of the spool 21 and couples a signal on line 31b to the microprocessor so that the microprocessor can properly time the multiplexed electrical signals with the mechanical multiplexer position.

In operation, the spool is rotated as illustrated by arrow 32 to reduce sliding friction, and the linear actuator 26 controls the position of the spool. A metering land 33 on the spool controls the coupling of the supply 22 and drain 23 lines to the outlet port 24. Thus, when the spool is driven downwardly (from the position illustrated in FIG. 1), the supply line 22 is controllably coupled to the outlet port 24. Similarly when moved higher than the position illustrated in FIG. 1, the sump line 23 is connected to the outlet port 24 for draining fluid from the associated actuator.

In order to multiplex such a pilot valve, a plurality of outlet channels 24a, 24b, 24c are provided, as illustrated in FIG. 2. Each of the outlet ports is connected to its associated actuator to control its position. The spool is modified as illustrated in FIGS. 2 and 3 to function as a multiplexer. More particularly, above and below a metering land 33 are located additional built-up sections 35 of the same diameter as the metering land 33, but having cutout sections 34, in the illustrated embodiment in the form of truncated pies. Thus, with the valve in the closed position as illustrated in FIG. 1, the land 33 completely seals all of the outlet ports irrespective of the rotational position of the spool. However, when the vertical position of the spool is altered to open the valve to either supply or sump, the cutout segments 34 will be effective to couple such supply to the outlet port to which it is connected at that time. Thus, referring concurrently to FIGS. 2 and 3, if the spool is driven downwardly, and rotates clockwise as shown in FIG. 2, the supply will be connected to output port 24a for almost 120° of rotation of the spool. Subsequently, the spool will change vertical position and will then couple fluid to outlet port 24b for the next approximately 120° of rotation. Fluid will be coupled to outlet port 24c for the following 120° following which port 24a will be serviced again.

If one were to compare the multiplexed pilot valve illustrated in FIGS. 1-3 with a non-multiplexed pilot valve of the same size, it will be appreciated that the flow in the multiplexed valve is only 1/18th that of non-multiplexed valve. More particularly, the segment 34 provided for multiplexing in a three actuator system can be no more than about 60°. As a result, the flow rate as compared to a standard pilot valve is reduced by a factor of 6. Secondly, since the supply is distributed among three channels, the flow per channel is decreased by a further factor of 3, since each channel is serviced only about one third of the time. As a result, the flow is reduced by a factor of 18 which in most practical systems will require either a substantial increase in the size of the valve, or a return to use of the non-multiplexed system. Furthermore, there is a practical limitation on increasing the size of the valve imposed by the limitations of the ability of the torque motor to controllably position the greater mass of a larger spool. It will also be apparent from an examination of FIG. 2 that the valve can be fully open for only a very small proportion of its total operating cycle. More particularly, the commutating segment 34 and the ports 24a-24c are of about the same size, such that the valve is fully open for only the brief interval where the commutating segment is directly facing an outlet port. At all other times, it is either opening or closing, with the result that flow rate is even further reduced.

It is applicant's belief that a system of that type could not be reduced to practice for any but the most rudimentary systems because of a number of limitations, the most prominent one being the substantially reduced flow rate to any given actuator for a servo valve of any reasonable size. The flow rate reduction is a result of two factors—1) reduced flow through a pilot valve which is configured as a multiplexer, and 2) the fact of multiplexing itself which has flow going to an actuator only during its time slot. Thus, while in principle the system might work in applications where speed of response and fineness of control are not important criteria, in a jet engine control, for example, the concept would not appear to be workable.

Multiplexing of hydraulic circuits is not broadly new. It can be used for example in sharing a single transducer among a number of hydraulic or pneumatic channels, such as illustrated in Moore et al. U.S. Pat. No. 3,645,141. The opportunity to share a control servo valve among multiple actuators is also suggested in the literature, but not on a simultaneous real time basis, insofar as applicants are aware. Applicants, however, know of no prior attempts where multiplexing has been successfully used in control of high performance hydraulic systems such as for gas turbine engine control, where the requirements are for precise position control, a wide range of controllable actuator speeds, and a demand, at least for some channels, of high speed controlled movement of the actuator. Thus, while a pressure sensing application (e.g., Moore) can be configured to share a single transducer among multiple channels, because no substantial fluid flow is required for that application, and while in low performance applications it may be possible to selectively connect different hydraulic circuits to a single servo valve, it has not heretofore been possible to accurately control a plurality of high performance actuators which require substantial fluid flow to generate adequate force or sufficient rate of movement in a hydraulically multiplexed system. It is for those reasons, perhaps among others, that designers have traditionally thought in terms of one control for one actuator in applications like aircraft engines where a plurality of such actuators must be capable of virtually simultaneous action and have a relatively high fluid flow rate needed in order to meet performance requirements.

In view of the foregoing, it is a general aim of the present invention to provide a more practical and reliable multiplexing control for high precision servo systems.

In that regard, it is an object of the present invention to provide a reliable, highly accurate multiple channel hydraulic control in which the control elements are shared among a plurality of actuators without substantial sacrifice of positioning speed or accuracy.

According to one aspect of the invention, an object is to provide such a control capable of meeting the control requirements for modern gas turbine engines.

It is a feature of the present invention that size and weight reduction are achieved by multiplexing a single pilot valve to a plurality of actuators at a sacrifice in actuator response time which is tolerable for many systems. A pilot valve is configured for full flow, and a separate commutator is fed by the pilot valve, the relative sizes of the pilot valve and commutator being coordinated to maximize flow rate to the actuator. Thus, the pilot valve converts a time division multiplexed (TDM) sequence of electrical signals to a TDM sequence of hydraulic signals, the commutator distributes those hydraulic signals to the respective channels, and a control means coordinates the positions in time of the TDM hydraulic signals with the rotational position of the commutator.

Other objects and advantages will become apparent upon reference to the detailed description when taken in conjunction with the drawings, in which:

FIGS. 10–12 are vertical sections taken along respective lines of FIG. 9 showing the multiplexing porting arrangement.

While the invention will be described in connection with certain preferred embodiments, there is no intent to limit it to those embodiments. On the contrary, the intent is to cover all alternatives, modifications and equivalents included within the spirit and scope of the invention as defined by the appended claims. For example, while emphasis is placed in the disclosure on a three channel system, it will be apparent to those skilled in the art that a larger (or smaller) number of channels can be provided depending on required flow rates and desired system response characteristics.

Figure 5:
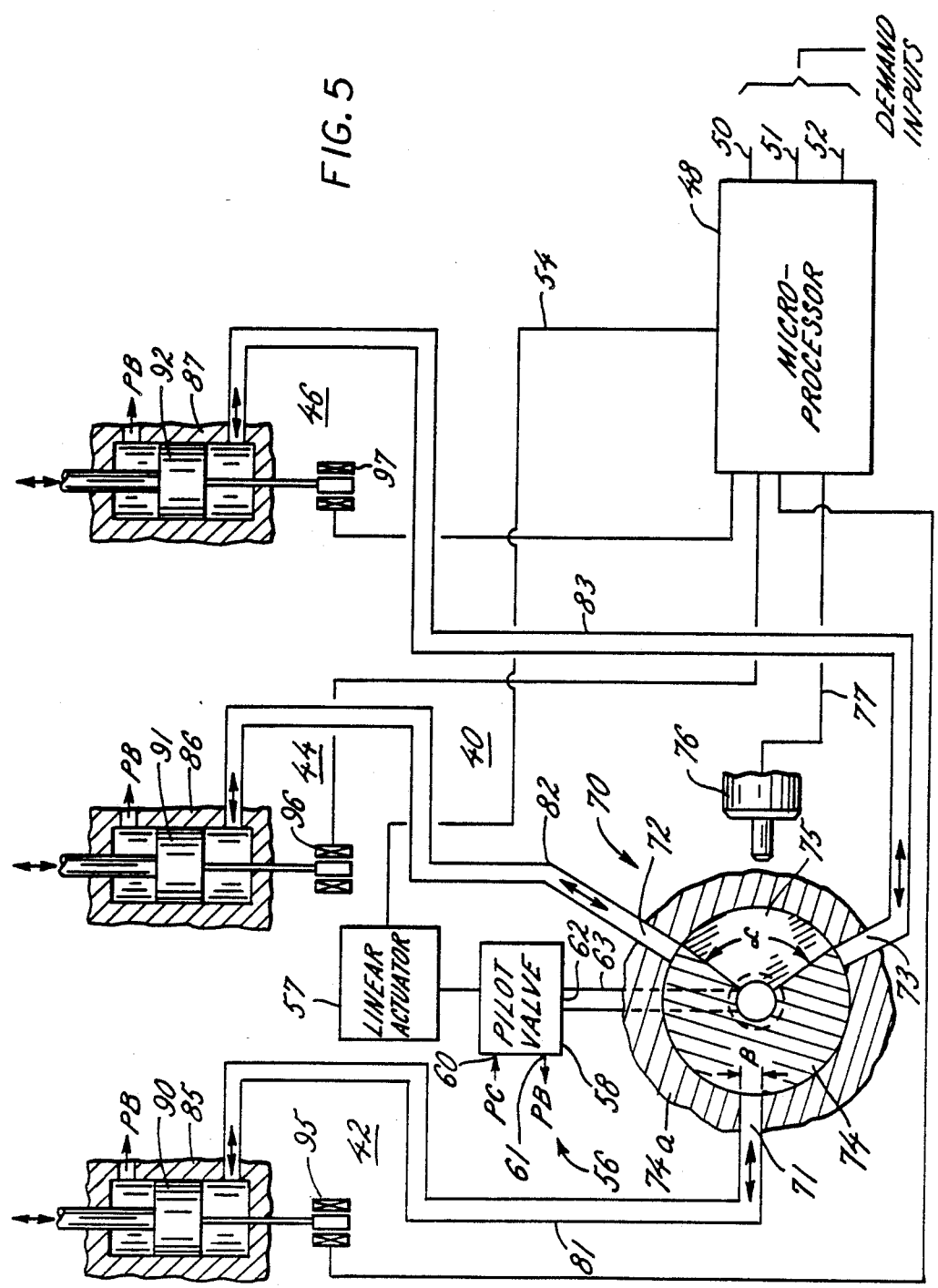
FIG. 5 is a diagram showing a multiplexed hydraulic system constructed in accordance with the present invention.

Turning now to the drawings, FIG. 5 schematically illustrates a time division multiplexed hydraulic control system exemplifying the present invention. More particularly, FIG. 5 illustrates a time division multiplexed (TDM) hydraulic control system 40 having a plurality of channels in the illustrated embodiment comprising three channels 42; 44, 46. A control means, illustrated as microprocessor 48, coordinates the elements of the system and establishes control set points and control signals for positioning actuators in each of the channels. The actuators in turn, may be used to control physical elements such as jet aircraft control devices which establish fuel feed rate, variable engine geometry positions, etc.

Figure 1:
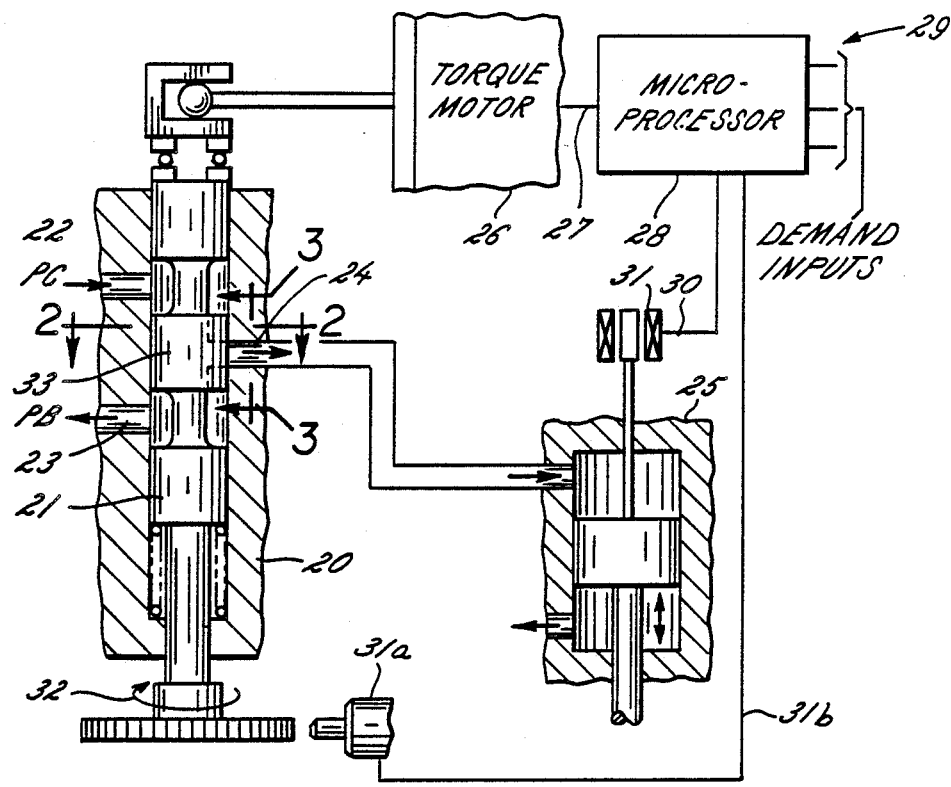
FIG. 1 is a fragmentary schematic view, in elevation, showing applicant's understanding of a prior concept of a multiplexed pilot valve.

The microprocessor 48 receives an electrical input signal for each channel on input lines 50, 51, 52 and processes those input demand signals along with feedback signals and the like to produce a control signal for each channel which is related to the demanded position of the actuator in the channel. Those control signals are output on a TDM bus 54 in respective time slots and transmitted on the bus 54 to a hydraulic control generally indicated at 56. The hydraulic control 56 includes a linear actuator 57 in the form of a torque motor or voice coil. The linear actuator controls the degree of opening of a pilot valve 58, typically a spool valve which will be described in greater detail below. It is seen that the pilot valve has a high pressure (PC) inlet port 60, a low pressure (PB) or sump port 61, and an outlet port 62 connected to an outlet conduit 63. In contrast to the valve illustrated in FIG. 1 which allowed flow through only a minor segment of its circumference the pilot valve 60 of FIG. 5 is arranged for substantially full flow in a manner to be described below. Thus, displacing the spool either upwardly or downwardly causes flow from the high pressure or sump inlet ports to the outlet port over the full port area of the valve, and the rate of flow is dependent upon the degree of displacement of the spool. As a result, the electrical signals on TDM bus 54 are transformed by the linear actuator and pilot valve to a series of TDM hydraulic signals in the conduit 63. The hydraulic signals in the conduit 63 are representative of the electrical signals on the TDM bus 54 and are in the same sequence, one for each of the channels in the system.

In practicing the invention, the hydraulic signals in the conduit 63 are distributed to the respective channels for effective control of the actuator in each channel. More particularly, the conduit 63 has its output coupled to a distribution means, in the illustrated embodiment shown as a rotary commutator 70 having a plurality of outputs 71, 72, 73. It is seen that the commutator has a body 74a in which is closely fit a rotatable cylindrical member 74 having a substantial cutout or slot 75 serving as the commutator element. Thus, fluid which enters the commutator by way of conduit 63 from the pilot valve 58 is selectively distributed to the outputs 71, 72, 73 in dependence on the rotary position of the segment 75 of the commutator element 74. Thus, as the commutator rotates from the position illustrated in FIG. 5 (assuming clockwise rotation), the port 73 will first be serviced followed by the port 71 and then the port 72. Thus, fluid flow from the comparatively smaller but full flow pilot valve 58 is sequentially coupled through the comparatively larger commutator 70 to each of the output channels in turn. A position feedback device 76 detects the position of the commutator 70 and transmits a position signal on line 77 to the microprocessor 48 so that the microprocessor controls the time slots of the electrical signals on the bus 54 to correspond to connections between the commutator slot 75 and the associated outlet ports 71, 72, 73.

As shown in FIG. 5, the outlet ports 71, 72 and 73 are coupled to the actuator means in their respective channels 42, 44, 46. More particularly, outlet conduits 81, 82, 83 are coupled at one end to the outlet port 71, 72, 73, respectively, and at the other as inlets to hydraulic servo actuators 85, 86, 87. Thus, when fluid from the high pressure source is passed through the pilot valve 58 and the commutator 70 to one of the outputs such as outlet port 71, the resulting fluid flow to the actuator 85 during the time slot of the commutating cycle devoted to the channel 42 causes the piston 90 of that actuator to be advanced. Similarly, when the pilot valve 58 position is such that the sump is controllably connected to the commutator, and when the commutator position is such that it is servicing outlet port 72, fluid is drawn from the lower chamber of the servo actuator 86 to retract the piston 91.

It is further seen that each actuator is provided with feedback means illustrated as position sensors 95, 96, 97. Feedback signals produced by the potentiometers are coupled by way of the illustrated electrical connections back to the microprocessor 48 for the purpose of providing information on the actual position of each actuator and, in certain circumstances, on the rate of movement of the actuator. Such feedback information is used in the microprocessor control sequences which develop, based on the demand input signals 50, 51, 52 and the feedback signals from the sensors 95, 96, 97 outputs for the pilot valve intending to drive each of the servo actuators 90, 91, 92 toward its demanded position. Of course, when the demanded positions are reached, there is no signal inserted in the TDM bus 54 for that particular channel, and the pilot valve remains in its central closed position for that channel, neither pumping hydraulic fluid to the actuator through the commutator nor withdrawing hydraulic fluid from the actuator through the commutator.

As pointed out above, in most practical systems, because of the limitations on the size of the pilot valve port, the size limitations associated with the conducting segment of the commutator, and the further fact that the hydraulic signals produced by the pilot valve are multiplexed rather than continuous, the flow rates for each channel from the commutator are typically insufficient for driving the associated actuators. In accordance with the invention, the pilot valve and commutator are separated, allowing the characteristics of each to be optimized, and relating the size of the commutator to the flow rate from a full flow pilot valve in order to maximize fluid flow to each of the channels which they are being serviced by the commutator. More particularly, as illustrated diagrammatically in FIG. 5 and as will be explained in greater detail below, the pilot valve can be a spool valve of a size conveniently associated with a torque motor, such as a $\frac{1}{4}''$ valve. Preferably, the outlet port is provided with a substantially full flow circumferential channel to maximize flow past the land of the spool when the valve is open. The commutator 70 is sized much larger than the pilot valve, preferably on the order of a 1" diameter device, which provides a number of benefits. First of all, the larger commutator allows greater fluid flow through the commutator, accepting full flow from the pilot valve and passing it to the actuator. Secondly, as the diameter of the commutator increases, the angular expanse $\alpha$ of the commutating segment 75 becomes comparatively larger with respect to the angular expanse $\beta$ of each of the outlet ports. As a result, the angular expanse $\alpha$ of the segment 75 can be much larger than that of the valve of FIG. 1, and furthermore, the valve is fully open for a significantly greater portion of its rotational cycle. Thus, the only limitations on the quantity of fluid or flow rate which can be provided to each of the actuators are those provided by the opening of the pilot valve itself, and the limitations inherent in time sharing between a plurality of output channels. However, in many cases, the system of FIG. 5 is entirely adequate to service several channels of actuators in applications which require comparatively prompt response and relatively rapid actuator travel.

Figure 6:
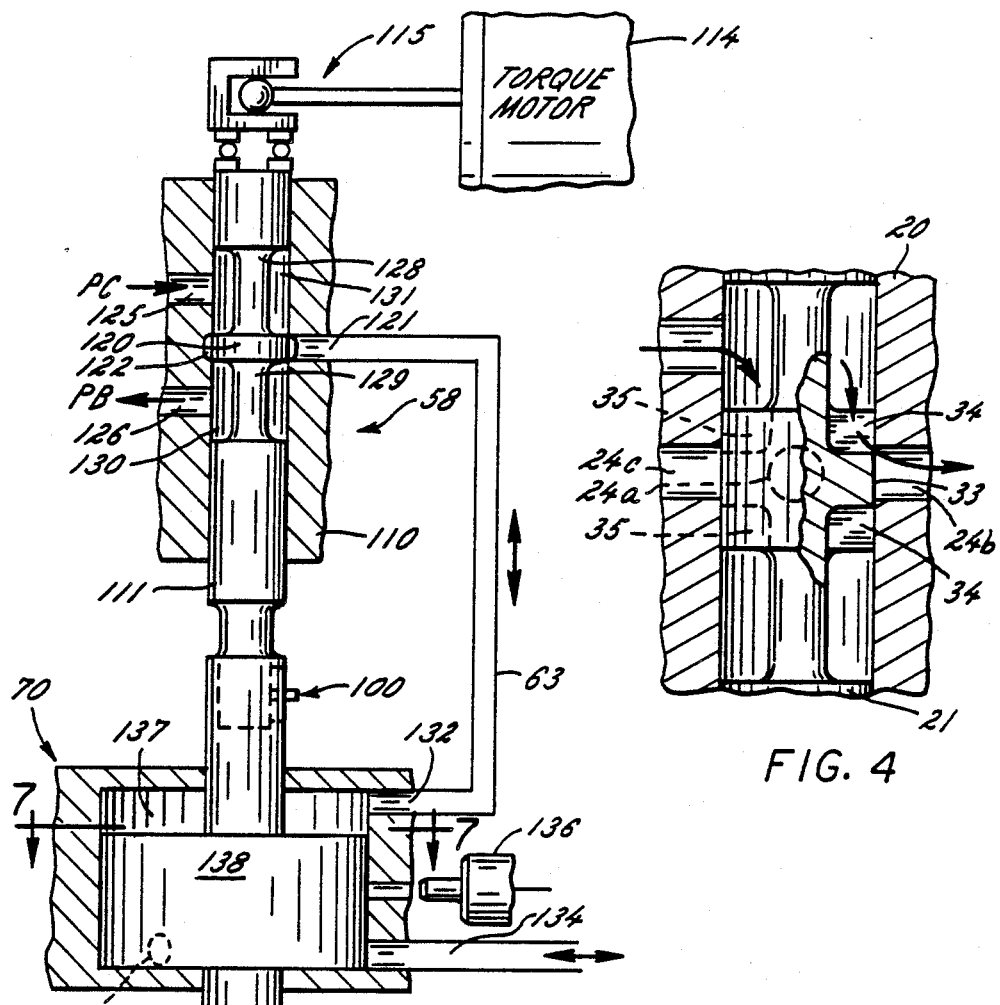
FIG. 6 is a vertical section showing the pilot valve and separate but coupled hydraulic multiplexer of the system of FIG. 5.
Figure 4:
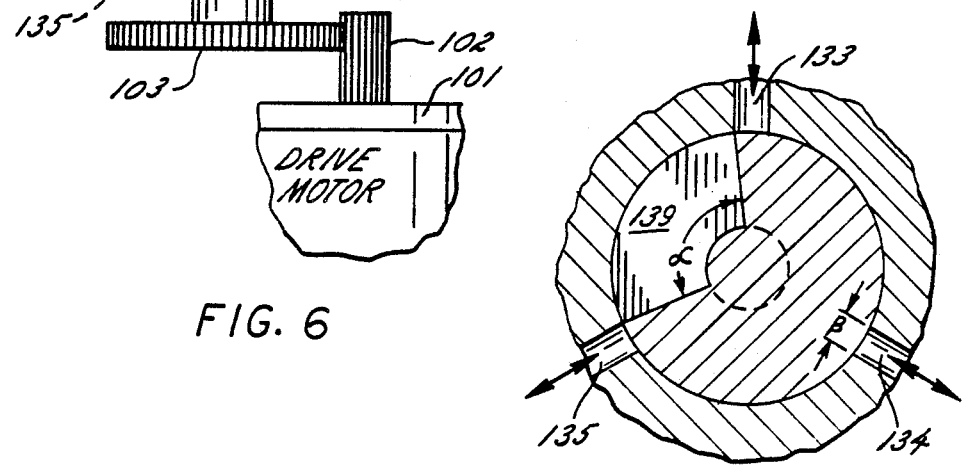
FIG. 4 is a section similar to FIG. 1 but showing the valve partly and controllably open.
Figure 7:
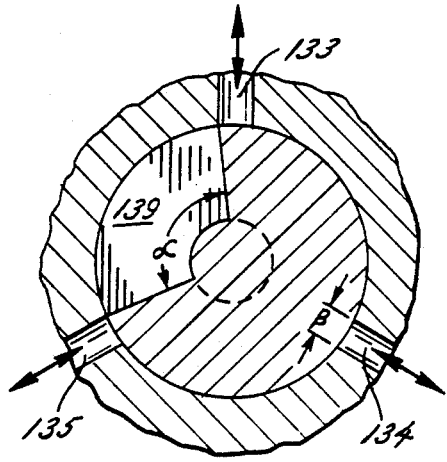
FIG. 7 is a plan sectional view taken along the line 7—7 of FIG. 6 showing the independent commutator.

With that basic understanding of the system in mind, attention will now be directed to FIGS. 6 and 7 which show, partly in schematic form, the separate substantially full flow pilot valve and related commutator exemplifying the present invention. In the FIG. 6 and 7 embodiment, the system is intended to be in the form of a unitary assembly, although the base member for mounting the commutator, pilot valve and associated torque motor is not illustrated for the purpose of simplicity. Furthermore, it is seen that the spool of the pilot valve and commutator are intended to be rotated in synchronism, being joined by means of a coupling member 100. Accordingly, a single drive motor 101 operating through meshed gears, 102, 103 rotates both the commutator and the spool of the pilot valve. It will be appreciated, that such unitary drive is solely for purposes of convenience, and the elements can be rotated independently; there is no requirement that they be rotated at the same rate, since rotation for purposes of multiplexing is accomplished solely in the commutator, and the commutator position is sensed by its associated position pickup. It will also be appreciated that the dedicated drive motor 101 can be eliminated and replaced by a direct drive from the controlled equipment, such as a gearbox driven directly by a gas turbine engine in aircraft applications.

As shown in FIG. 6, the pilot valve 58 has a valve body 110 which can be supported on an appropriate base member. Mounted for reciprocation and rotation within the valve body 110 is valve spool 111. By means of drive motor 101, its associated gearing and coupling 100, the spool 111 is rotated at a speed sufficient to reduce sliding friction of the spool 111 within the body 110.

For controllably positioning the spool 111 within the valve body 110, a linear actuator, shown herein as torque motor 114, is provided. As is well known, the torque motor responds to the current level supplied on its input, and acts through a coupling generally illustrated at 115 to slightly raise or slightly lower the spool 111 within the valve body 110 thereby to controllably open or close the valve. It is seen that coupling 100 which connects the spool 111 to the commutator 70 is of the pin and slot type, which allows the spool to be raised or lowered without affecting the commutator. In a typical application, it is not unusual for torque motor to have about 0.020" to 0.025" of travel in either direction from the central quiescent condition illustrated in FIG. 6.

In many applications, instead of employing a torque motor as the linear actuator for controlling the vertical position of the spool, a voice coil is utilized. The voice coil, a magnetic driver typically used in audio speakers, has a stationary magnet and a low mass movable coil which is attached to the valve spool. The voice coil provides the advantage of a greater range of controllable positioning, less moving mass, and greater expected life in multiplexing applications where the spool can be expected to be repositioned multiple times during each rotation of the commutator.

Referring in greater detail to the metering elements of the pilot valve, it is seen that the spool 111 is provided with a metering land 120. In the closed position of the valve, the metering land 120 is disposed opposite outlet port 121, to close that port. The outlet port 121 is preferably of the full flow variety and includes a circumferential channel 122 formed in the inner wall of the valve body 110 so that when the land 120 is displaced to open the valve, fluid can flow through the entire annular opening which is created.

FIG. 6 also illustrates the relationship between the outlet port 121 and the high pressure PC supply port 125 and a low pressure PB sump port 126. Because the supply and sump ports can be elongated in the axial direction, there is typically no need to supply full annular porting for the supply and sump. However, the area of the supply and sump ports should be larger than the maximum area of the outlet port.

As shown in FIG. 6, a pair of reduced diameter sections 128, 129 on the spool provide passages for flow of hydraulic fluid from the source and sump, respectively, to the outlet port under the control of the metering land 120. Thus, when the torque motor is actuated to raise the spool, a path for fluid flow is established between the outlet port 121 and the sump port 126 through the passage 130 formed by the relieved section in the spool. Similarly, when the torque motor drives the spool downwardly from the position illustrated in FIG. 6, hydraulic fluid flows from the inlet port through the passage 131 formed by the relieved section of the spool and by way of the channel 122 around the entire periphery of the metering land 120 to the outlet port 121. It will thus be appreciated that the spool valve is configured to maximize possible flow (when the valve is fully open in either direction) or provide lesser flow rates when slower actuator movement is desired. But in any event, for a given size valve, the valve is configured so as to provide adequate flow to be allowed to operate in a multiplexed environment.

It is noted in passing that in some applications the flow rate which can be provided by the pilot valve of FIG. 6 can be greater than necessary, and in those cases the full circumferential channel 122 associated with the outlet port need not be provided. Instead, in place of the full annular port, a series of more conventional rectangular ports can be machined in the valve forming a plurality of discrete ports all in communication with the outlet port 121. It will be demonstrated below that the percentage of the circumference of the land 120 which will support fluid flow is directly related to the rate of fluid flow which can be passed through the pilot valve.

As will now be apparent, the time division multiplexed electrical signals which are applied to the torque motor 114 produce a sequence of time division multiplexed hydraulic signals in the conduit 63 which are passed to the commutator 70. The commutator in turn delivers the hydraulic signals to the associated channels, sequentially coupling those signals from an input 132 to plural output ports 133, 134, 135 (see FIG. 7). For purposes of assuring that the time division multiplexed hydraulic signals are in sequence with the associated time division multiplexed electrical signals, a position feedback sensor 136, such as a magnetic or photoelectric sensor, is positioned adjacent the commutator for detecting the angular position thereof. Signals provided by the position sensor 136 are coupled back to the microprocessor 48 (FIG. 5) for coordinating the electrical signals provided to the torque motor 114 with the angular position of the commutator.

The commutator is illustrated somewhat schematically in FIGS. 6 and 7, but with adequate detail to appreciate the structure and function of the present invention. As shown in those figures, the inlet port 132 supplies hydraulic fluid to an upper chamber 137 within the commutator. The lower portion of the commutator houses a cylindrical rotatable member 138 which has a pie-shaped segment 139 removed therefrom so that hydraulic fluid which is coupled to the upper chamber 137 can be passed to the outlet port which is being faced by the cutout segment 139. Thus, as the drive motor 101 rotates the commutator, it sequentially services the ports 133, 134, 135 to either direct fluid to the associated actuators or withdraw fluid from the associated actuators depending upon the position of the pilot valve 58 for the time slot in question. It will also be apparent from an examination of FIGS. 6 and 7 that the commutator 70 has a diameter substantially larger than that of the pilot valve 58 which allows the pilot valve to be sized small enough for operation by the torque motor 114, but coordinates the size of the commutator to accept full flow from the pilot valve. In the preferable practice of the invention, the area for fluid flow of the commutator is made several times larger than the maximum port area of the pilot valve such that at least 90% of the pressure drop in the system is across the pilot valve, with only about 10% of the pressure drop being across the commutator.

Figure 8:
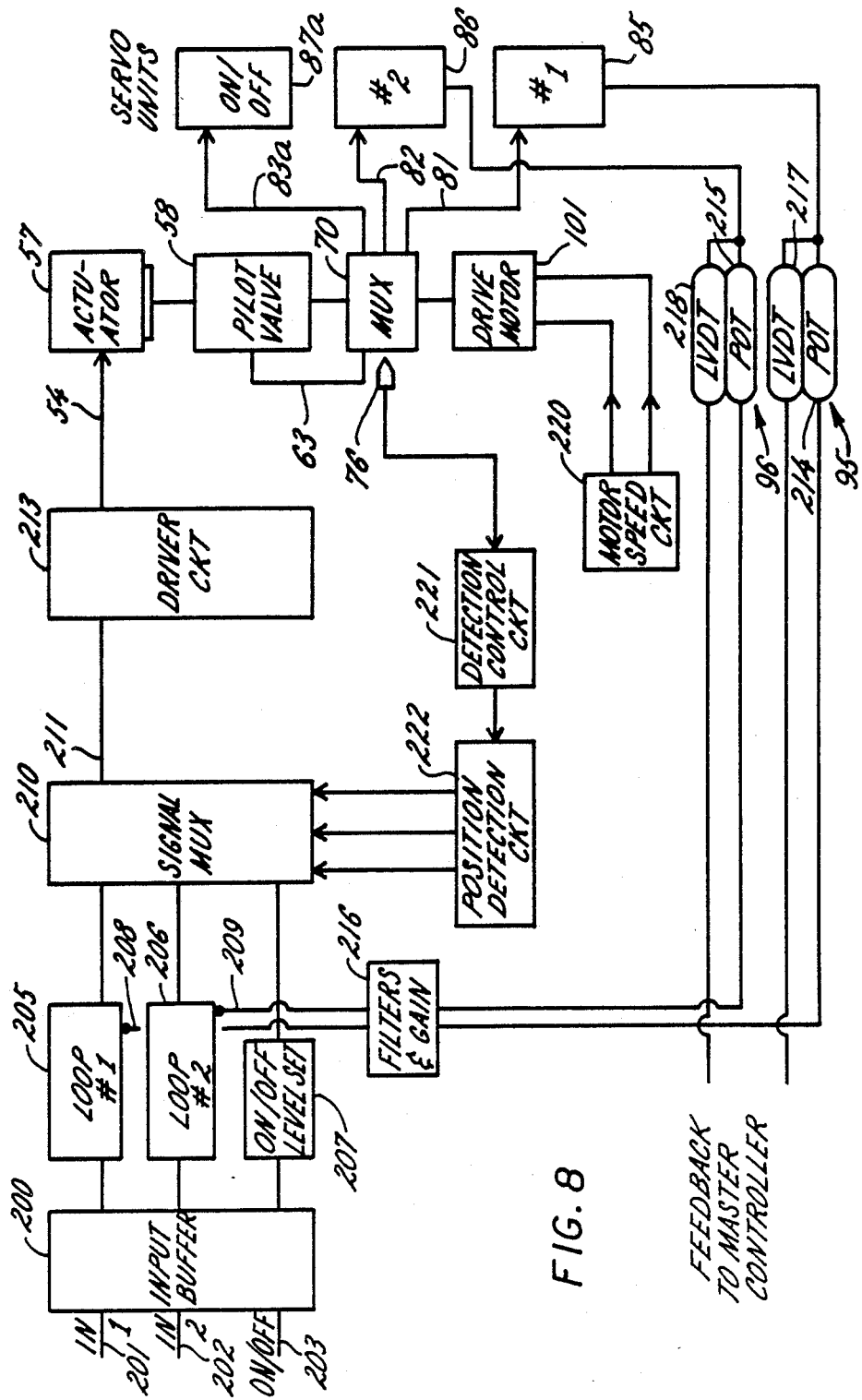
FIG. 8 is a schematic diagram illustrating a multiplexed control loop exemplifying the present invention.

Turning now to FIG. 8, there is shown a control loop for a three channel system similar to that disclosed in connection with FIG. 5, but differing in the structure of one of the channels. More particularly, two of the channels include servo actuators and their associated position feedback means, but a third channel illustrates a somewhat different control approach in that the actuator is a simple on/off device, and no position feedback is required. The system illustrates that one or several on/off devices can be intermixed with controlled position actuators in the multiplexed control.

Referring in greater detail to FIG. 8, there is shown an input buffer circuit 200 having three input signals coupled thereto on lines 201-203. Two of the input signals are like those described in connection with FIG. 5, i.e., have levels (typically current levels) which relate to a demanded position for the associated actuator. A third signal on line 203 is simply an on/off signal which demands that the actuator in the associated channel be switched either on or off. The signals having passed through the buffer 200 are coupled to associated control loops 205, 206, 207. The loops 205 and 206 are similar in that they compare the associated input signal from the buffer with a feedback signal on lines 208, 209, respectively, for establishing an output signal which is proportional to the flow intended to be sent to the associated actuator in the next cycle. As noted above, the feedback signal can be either a position signal or a rate signal, or both, which, when combined with the input demand signal as will be described below, produces an output signal for controlling the associated actuator.

The on/off signal from the third channel is coupled to on/off level set controller 207, and in this case needs no feedback from the associated actuator. The three signals from the three controllers are coupled as inputs to a signal multiplexer 210 which has a single output bus 211 having a time slot for each of the signals. The signal multiplexer in conventional fashion samples the input signals on its input lines and places samples in associated time slots for output on the TDM bus 211. Those signals are amplified in a driver circuit 213 and coupled on a TDM bus 54 to the linear actuator 57 which operates the pilot valve 58.

FIG. 8 shows the pilot valve only schematically, with its hydraulic output 63 coupled as an input to the hydraulic multiplexer 70. It is seen that the multiplexer 70 has three hydraulic outputs on lines 81, 82 and 83a, each being coupled to an associated servo actuator 85, 86, 87a. As in the previous embodiment, the servo actuators 85, 86 have feedback means 95, 96 coupled in the control loop. The actuator 87a is an on/off actuator driven by one output of the multiplexer 70. As shown in FIG. 8, a pair of feedback sensors may be provided for each servo actuator. The first includes potentiometers 214 and 215 which have signals passed through filter and gain circuitry 216 to serve as the feedback signals on lines 208 and 209. In addition, the feedback elements 95, 96 can include a second sensor illustrated as the LVDT sensors 217, 218 having lines coupled back as feedback to the master controller. The master controller may sense the position of the servos through the feedback means and adjust the demand signals on lines 201 and 202 to achieve actuator positions which might be computed by a master onboard computer.

Referring again to the multiplexer 70, it is driven by a motor 101 responsive to a driver circuit 220, the motor being coupled to the multiplexer for sequentially applying hydraulic output signals to the output channels 81, 82, 83a. A position detector 76 is also associated with the rotating assembly for detecting the rotary position of the multiplexer and acting through detection control circuit 221 and position detection circuit 222 to provide signals which control the signal multiplexer 210. Thus, the actual position of the rotary multiplexer, and thereby of the output port with respect to the output channels, serves as a signal input which acts on the multiplexer 210 to control the time slots in which each of the electrical signals are placed. As a result, any delays in the control circuit can be compensated for so that the actuator 57 drives the pilot valve 58 to the position associated with a particular channel immediately before the multiplexer opens the port connecting the pilot valve to the channel.

In practicing the invention, having separated the commutator and pilot valve, those individual elements are then optimized both with respect to each other as well as with respect to the system as a whole. In most cases, it is an acceptable design criteria to require most of the pressure drop in the system, i.e., about 90%, to be across the pilot valve and limit pressure drop across the commutator to the remaining 10%. Since pressure drop across a port is related to the square root of the port area, and since it is desired to have a 9:1 ratio in pressure drop, it is therefore required that the port area of the commutator be about three times larger than the port area of the pilot valve. An example will now be offered to illustrate how a typical system might be configured.

In hydraulic systems such as for use in aircraft, it is not unusual to use pilot valves of about $\frac{1}{4}''$ diameter. When operating such a pilot valve with a torque motor, a maximum stroke in either the positive or negative direction from rest is about 0.025". If, as illustrated in FIG. 6, the pilot valve has a substantially continuous channel formed in the body for substantially full flow around the periphery of the $\frac{1}{4}''$ land when it is displaced from its rest position, the maximum port area can be considered to be the circumference of the land multiplied by the maximum stroke. Thus, for a $\frac{1}{4}''$ valve, the circumference of the $\frac{1}{4}''$ diameter land is approximately 0.785" which, when multiplied by a maximum stroke of 0.025", yields a total port area of about 0.02 square inches. Thus, in order to achieve most of the pressure drop across that pilot valve and minimize pressure drop across the commutator, it would be useful to have a commutator port area of at least 0.06 square inches.

While the illustration of the commutator in FIG. 6 is partly schematic, it will be appreciated that ports of the appropriate size and shape can be machined into the valve body for each of the channels. As will be described in greater detail below, those ports are preferably elongated with longer dimension being parallel to the axis of the commutator such that the ports will open and close very quickly, minimizing the degree of rotation needed to render the port fully open or fully closed.

While a pilot valve design of substantially full flow is preferred for most systems, in some cases it is possible to satisfy system requirements with a ported pilot valve. For example, the pilot valve 58 of FIG. 6 can be configured without the complete circumferential channel, but with three rectangular ports, each covering say 0.125" of the circumference. Thus, the total port area for the three ports will be 0.375" multiplied by the 0.025 maximum stroke, or in other words about 0.01 square inches, about half the area of the full annular port. In that case, the system will perform adequately with a commutator having a port area of at least about 0.03 square inches.

Turning now to FIGS. 9–12, there is shown the structure of a three channel commutator which demonstrates the application of shaped elongated ports. A rotor member 150 is disposed for rotation within a cylindrical ported stator housing 151. The details of the drive mechanism and bearing support have been eliminated for simplicity of illustrating the invention.

It is seen that the rotor 150 is cylindrical in shape, has an internal cylindrical cavity 152 and ports for receiving hydraulic fluid from the pilot valve and controllably passing that fluid to the channels in sequence. More particularly, the rotor 150 has an internal cavity 152 coupled by a ports 153 through associated ports 154 in the stator assembly. Cylindrical passage 156 surrounding the ports 154 communicates with inlet 157 and from there via a conduit to the pilot valve. Thus, when fluid flows from the pilot valve or to the pilot valve, the passage for flow is through inlet 157 and cylindrical passage 156 via the ports 154 and 153 to the internal cavity 152. The ports 154 and 153 are disposed intermittently around the periphery of the rotor and stator so as to present a greater area for flow to or from the pilot valve than any of the individual channel porting arrangements, so as to avoid introducing a limiting flow condition at that point.

For the purpose of controllably passing fluid from the pilot valve inlet ports 153, 154 to the respective channels, the rotor 150 is ported in a manner which cooperates with additional ports on the stationary sleeve 151. More particularly, referring first to outlet port 160 associated with channel 42, and referring concurrently to FIGS. 9 and 10, it is seen that the rotor 150 has a pair of cutouts 161, 162 which cooperate in the illustrated condition with a pair of elongated ports 163, 164 in the stator 151. Thus, for a part of the rotational sequence of the rotor 150 lasting about 60°, the cutouts 161, 162 and thereby the interior of the chamber 152 is in communication via ports 163, 164 with ring-shaped passage 165. Fluid which flows to or from the pilot valve to the internal chamber 152 thereupon passes through the commutating segments 161, 162 and ports 163, 164 through the passage 165 outlet 160 to the servo actuator in channel 42. It is seen from FIGS. 11 and 12 (in combination with FIG. 9) that each of channels 44 and 46 has a similar arrangement but with the internal passages connected to internal chamber 152 in different angular positions of the rotor. Thus, assuming the rotor rotates clockwise as illustrated in FIGS. 10–12, when the cutouts 161, 162 have closed off respective ports 163, 164, additional cutouts 170, 171 in the rotor 150 begin to open ports 173, 174 associated with channel 44. A similar ring-type passage 175 in communication with the ports 173, 174 passes fluid which had originated from the pilot valve by way of a outlet 176 to the actuator in channel 44. Similarly, a pair of cutouts 180, 181, upon a further 60° of rotation, connect with ports 184, 183, passage 185 and outlet 186 to pass fluid to or from the actuator in channel 46.

Figure 9:
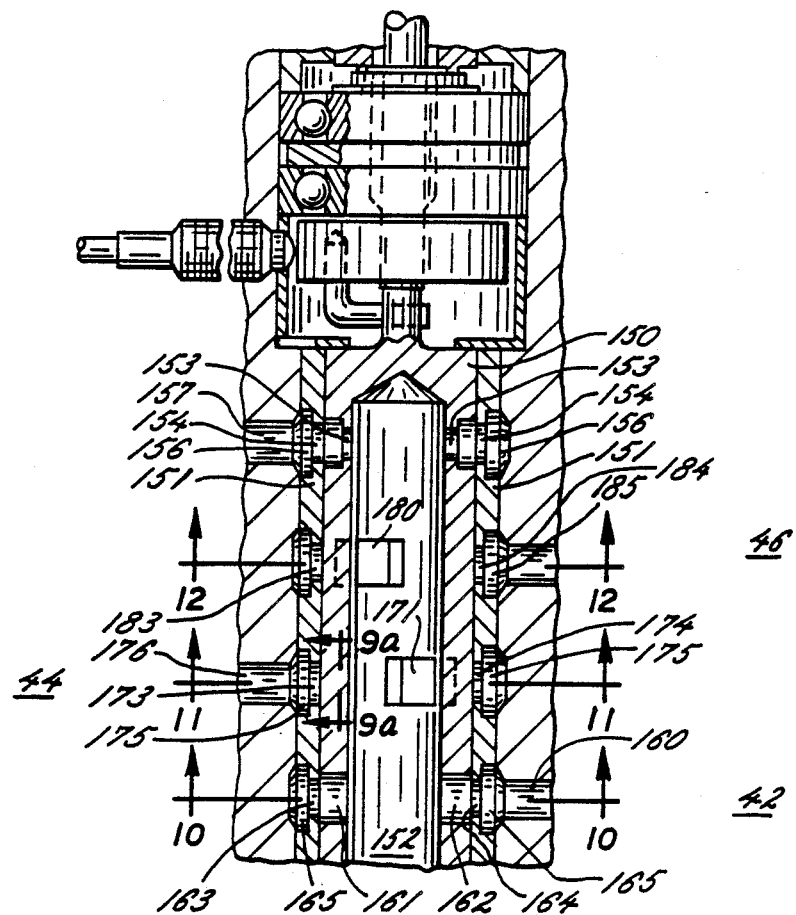
FIG. 9 is a partial sectional view showing a second embodiment of a multiplexer for use in the system of FIG. 5.
Figures 10, 12:
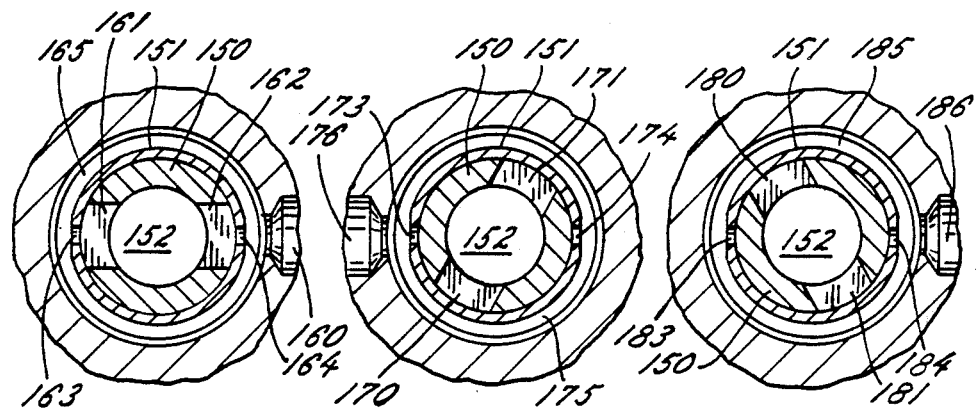
Figure 9A:
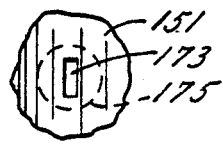
FIG. 9a is a partial sectional view taken along the lines 9a—9a of FIG. 9 illustrating the configuration of an elongated multiplexing port.

Referring to one of the ports, for example, port 173, it is seen in FIGS. 9a and 11 that the width of the port, the dimension disposed circumferentially of the commutator is fairly small as compared to the length of that port, which is disposed axially with respect to the commutator, as illustrated in FIGS. 9 and 9a. Thus, the width dimension can be minimized so that the port is opened quickly and closed quickly such that the majority of the rotational cycle has the port fully open or fully closed, while the length of the port in the axial direction can be configured to achieve the necessary port area. In an embodiment for cooperation with a ¼" pilot valve with full circumferential porting (which as recalled from the computations above has a port area of about 0.02 square inches), the commutator ports can be configured to be about 3/32" in circumferential width and about ¼" in axial length. Since there are two of such ports in the illustrated embodiment, there is provided a port area in excess of 0.09 square inches, thus exceeding the 3:1 area differential discussed above. Similarly, with the ported pilot valve having a port area of 0.01 square inches, the commutator can be configured also with 3/32" circumferential width, but only of about ¼" in axial length. Two of such ports yields a port area of about 0.047 square inches, exceeding the 3:1 port area differential discussed above. By providing two ports per channel as in the illustrated embodiment, flow rate is increased at a reasonable port width, while allowing for cycling from channel to channel at about 60° rotational intervals, thus servicing each channel more frequently than would the system of FIG. 6 rotated at a comparable speed.

Figure 2:
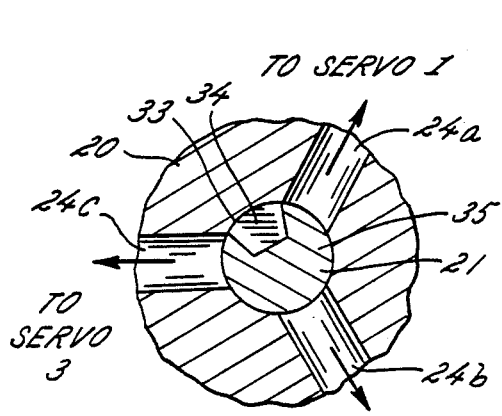
FIG. 2 is a sectional view taken along the line 2—2 of FIG. 1 showing the multiplexing metering land.
Figure 3:
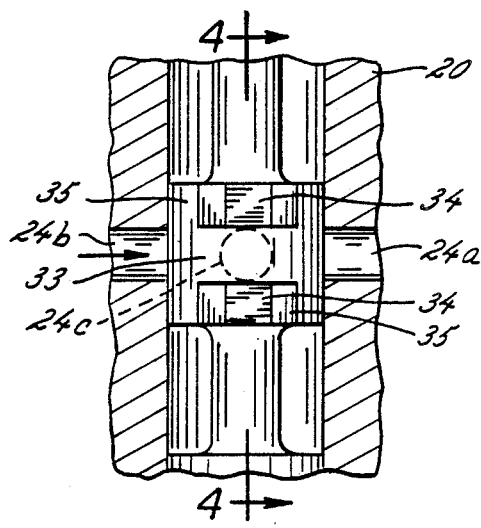
FIG. 3 is a partial vertical section taken along the line 3—3 of FIG. 1 showing the multiplexing metering land in elevation with the valve closed.

With respect to the diameter of the commutator valve, it should be several times the diameter of the pilot valve and preferably at least about four times its diameter. It will now be appreciated that an important criteria in configuring the commutator is to achieve the full open state as quickly as possible to minimize pressure drop across the commutator while it is opening or closing. Thus, it is desirable to use not only elongated slots, but also those which have their minor dimension disposed about the circumference of the commutator as best illustrated in FIG. 9a. However, those port widths, although small, do have a finite dimension such as 3/32". As the diameter of the commutator gets larger, the proportion of the circumference of the commutator occupied by ports of a given size proportionately decreases. More particularly, assuming ports of defined area are required, those ports occupy proportionally less of the overall multiplexing cylinder area and therefore are fully open for a proportionally greater percentage of each rotational cycle. A comparison of that structure with that illustrated in FIG. 2 where the small size of the pilot valve/commutator arrangement tended to make commutator opening and closing a proportionally greater part of the rotational cycle will further lend appreciation to the undesirable pressure drops and substantially reduced flow rates which result from the use of that system.

In some more complex systems, such as systems with a larger number of channels or a larger diameter spool valve for increased flow, there is the possibility of increasing the size and therefore the mass of the spool valve beyond that which can be conveniently driven at a desired operating frequency by a torque motor or voice coil. In such cases, it is preferred to practice the invention by associating hydraulic amplification means with the pilot valve, interposed between the electrical multiplexer and the spool of the pilot valve which produces the hydraulic signals for distribution to the actuators. An example of such hydraulic amplification means is illustrated in FIG. 13.

Figure 13:
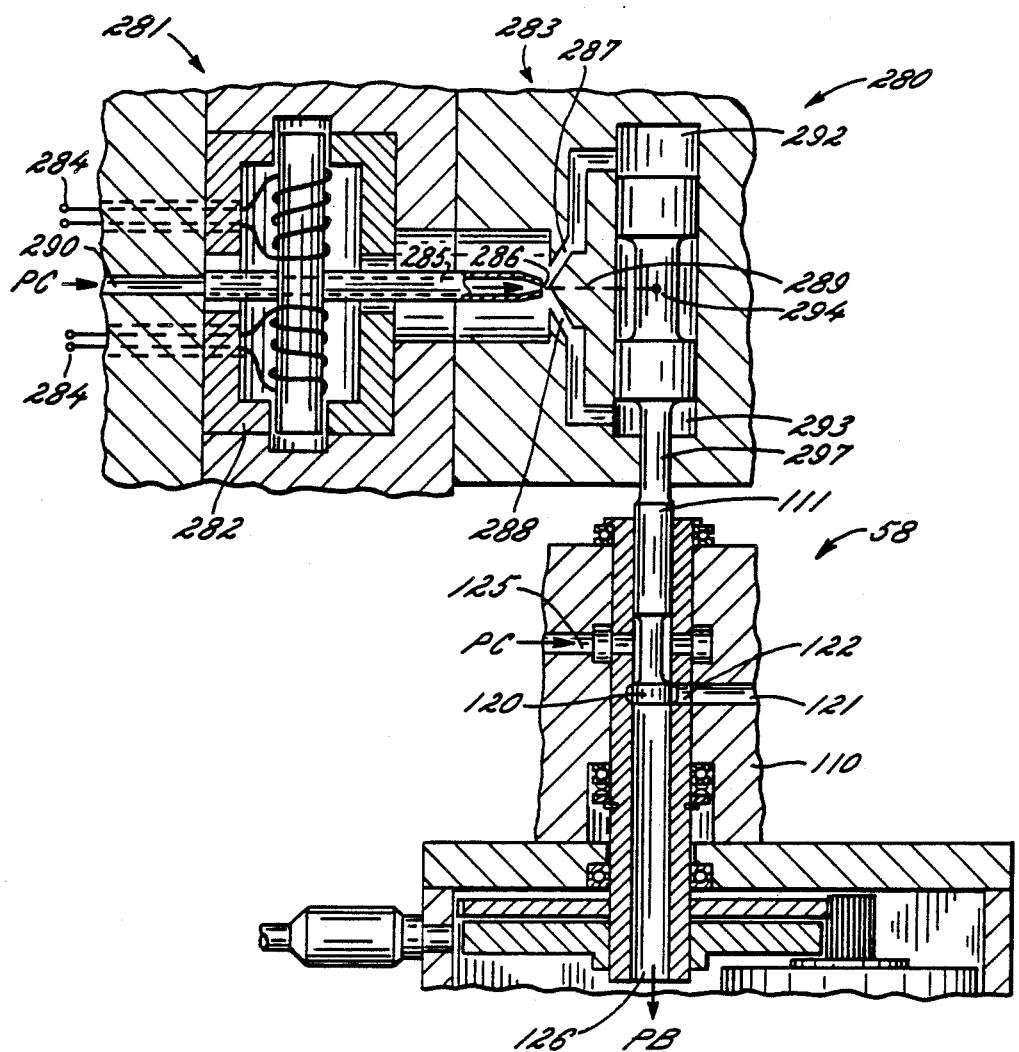
FIG. 13 is a diagram illustrating a pilot valve having hydraulic amplification means on the inlet side for enhancing the force on the spool valve achieved by the multiplexed electrical signals.

More particularly, FIG. 13 diagrammatically shows the pilot valve 58 having high pressure inlet port 125, sump port 126, spool 111, cylindrical body 110, metering land 120, full annular port 122 and outlet port 121 as generally illustrated in connection with FIG. 6. However, rather than driving the spool 111 directly from the electrical actuator as illustrated in FIG. 6, the FIG. 13 implementation provides hydraulic amplification means 280 interposed between the pilot valve 58 and the electrical actuator 281 which drives it. In the FIG. 13 embodiment the hydraulic amplification means is illustrated as a torque motor 282 driving a jet pipe arrangement 283. Electrical input lines 284 convey the TDM electrical signals to the torque motor 282. The torque motor in turn is mechanically coupled to the jet pipe assembly 283 which has an orifice 286 at the end of a pipe 285 disposed intermediate a pair of pressure sensing orifices 287, 288. The jet pipe 285 has a hydraulic input 290 coupled to the high pressure hydraulic supply PC. Thus, hydraulic fluid is continually pumped into the inlet 290 and through the nozzle 286. With no signal on the torque motor, the jet pipe 285 is positioned with the nozzle 286 mid-way between the orifices 287, 288. Thus, the hydraulic fluid which is coupled through the inlet 290 will split evenly between the orifices 287, 288, creating equal pressures in the upper and lower chambers 292, 293 of an amplifying spool valve 294. As a result, the spool valve will be in its intermediate position. When an electrical signal is coupled to the torque motor via the input lines 284, the jet pipe 285 will be deflected either upwardly or downwardly, causing a different split in the hydraulic flow between the orifices 287, 288. Thus, if the jet pipe is deflected downwardly, the pressure in lower orifice 288 will increase with respect to that in upper orifice 287, driving the spool 294 upwardly. Similarly, if the jet pipe is deflected upwardly, the difference in pressure split between the two orifices will drive the spool 294 downwardly. A feedback spring 289 connects the spool 294 to the jet pipe 285, so the movement of the spool 294 has an effect on the jet pipe position. It is also seen that a mechanical connection 297 couples the spool 294 to the pilot valve spool 111, such that the pilot valve spool 111 will be positioned in response to signals applied to the torque motor 282. Since a comparatively smaller deflection in the jet pipe 285 will cause a comparatively larger movement in the spool 294, and since the spool 294 movement is coupled to the pilot valve spool 111, it will be appreciated that with the same size torque motor or voice coil, an electrical signal of a given magnitude will cause a greater deflection in the pilot valve spool 111, achieving the desired amplification effect.

It will now be appreciated that what has been provided is an improved multiplexed hydraulic control system in which separate pilot valve and commutator elements are provided, with the pilot valves being sized to cooperate with a reasonable torque motor to provide adequate fluid flow for the actuator, and with the commutator being sized and configured to pass substantially all of that fluid flow to the associated actuator with a minimum of pressure drop, thus assuring the shared pilot valve maximum opportunity to drive the actuators which it is controlling on a multiplexed basis.

We claim as our invention:

1. A time division multiplexed (TDM) hydraulic control system having a plurality of channels for individually controlling the positions of a plurality of hydraulic actuators in the respective channels in accordance with an associated plurality of electrical control signals, the TDM control system comprising the combination of:
    a pilot valve having a valve spool linearly positionable within a valve body, the body having substantially full annular porting controllably opened or closed by a metering land on the spool, linear actuator means associated with the spool for positioning the metering land to control the output flow rate of the pilot valve;
    control means including electrical multiplexer means for sequentially feeding electrical control signals to the pilot valve, the electrical control signals being related to the plurality of hydraulic channels to be controlled;
    a rotating commutator valve having a plurality of outputs, one for each channel, the commutator valve having an input for receiving the output of the pilot valve, means for causing the commutator valve to rotate for sequentially distributing the pilot valve output to the commutator valve outputs;
    means connecting the commutator valve outputs to the actuators for controlling the positions thereof; and
    the commutator valve having a port area for each channel which is greater than the maximum port area of the pilot valve.

2. The TDM control system as set forth in claim 1 further including:
    position sensor means for sensing the angular position of the commutator valve and producing an electrical signal for feedback to the control means; and
    the control means having means responsive to the position sensor means for coordinating the electrical control signals coupled to the pilot valve through the multiplexer means with the angular position of the commutator valve.

3. The TDM control system as set forth in claim 1 further including feedback means for producing signals relating to the position of the actuators and modifying the electrical control signals in accordance therewith.

4. The TDM control system as set forth in claim 1 further including position sensor means associated with each actuator, position control means for establishing a set point for each actuator, the position control means being responsive to the position sensing means for producing an error signal related to the difference between the set point and the actual actuator position, said position control means including means for altering the electrical control signal for each channel in dependence on the error signal.

5. The TDM control system as set forth in claim 1 in which the port area of the commutator for each channel is at least three times the maximum port area of the pilot valve.

6. The TDM control system as set forth in claim 1 further including hydraulic amplification means interposed between the electrical multiplexer means and the pilot valve.

7. The TDM control system as set forth in claim 1 in which the commutator outlet ports are in the form of elongate slots for passage of hydraulic fluid to the respective channels, the smaller dimension of the elongate slots being disposed circumferentially with respect to the commutator and the longer dimension axially thereby to increase flow while minimizing the degree of rotation needed to fully open the respective ports.

8. The TDM control system as set forth in claim 7 in which the elongate slots are rectangular in shape.

9. The TDM control system as set forth in claim 1 in which the commutator valve includes a rotor disposed for rotation within a stator, the stator having a series of elongate ports, one for each channel, the rotor having an internal chamber for receiving fluid from the pilot valve, slot means in the rotor coordinated with the ports in the stator for controllably and sequentially passing hydraulic fluid from the pilot valve through the stator ports as the rotor rotates within the stator.

10. The TDM control as set forth in claim 9 in which the ports in the stator are elongate in shape, with the longer dimension of the elongate ports being generally parallel to the axis of rotation of the rotor.

11. The TDM control system as set forth in claim 10 in which the elongate slots are rectangular in shape.

12. The TDM control system as set forth in claim 11 further including hydraulic amplification means interposed between the multiplexer means and the pilot valve, the hydraulic amplification means being responsive to the electrical control signals and being mechanically coupled to the pilot valve for enhancing the force applied to the valve spool in response to said electrical signals.

13. A time division multiplexed (TDM) hydraulic control system having a plurality of channels for individually controlling the positions of a plurality of hydraulic actuators in the respective channels in accordance with an associated plurality of electrical control signals, the TDM control system comprising the combination of:
a pilot valve having a valve body with substantially full annular porting controllably opened or closed by a valve actuator;
control means including electrical multiplexer means for sequentially feeding electrical control signals to the pilot valve, the electrical control signals being related to the plurality of hydraulic channels to be controlled;
a commutator valve having a plurality of outputs, one for each channel, the commutator valve having an input for receiving the output of the pilot valve, means for causing the commutator valve to sequentially distribute the pilot valve output to the commutator valve outputs;
means connecting the commutator valve outputs to the actuators for controlling the positions thereof; and
the commutator valve having a port area for each channel which is greater than the maximum port area of the pilot valve.

14. The TDM control system as set forth in claim 13 further including feedback means for producing signals relating to the position of the actuators and modifying the electrical control signals in accordance therewith.

15. The TDM control system as set forth in claim 13 further including position sensor means associated with each actuator, position control means for establishing a set point for each actuator, the position control means being responsive to the position sensing means for producing an error signal related to the difference between the set point and the actual actuator position, said position control means including means for altering the electrical control signal for each channel in dependence on the error signal.

16. The TDM control system as set forth in claim 13 in which the port area of the commutator for each channel is at least three times the maximum port area of the pilot valve.

17. The TDM control system as set forth in claim 13 further including hydraulic amplification means interposed between the electrical multiplexer means and the pilot valve.

18. The TDM control system as set forth in claim 13 in which the commutator valve includes a rotor disposed for rotation within a stator, the stator having a series of elongate ports, one for each channel, the rotor having an internal chamber for receiving fluid from the pilot valve, slot means in the rotor coordinated with the ports in the stator for controllably and sequentially passing hydraulic fluid from the pilot valve through the stator ports as the rotor rotates within the stator.

19. The TDM control as set forth in claim 18 in which the ports in the stator are elongate in shape, with the longer dimension of the elongate ports being generally parallel to the axis of rotation of the rotor.

20. The TDM control system as set forth in claim 19 in which the elongate slots are rectangular in shape.

21. The TDM control system as set forth in claim 20 further including hydraulic amplification means interposed between the multiplexer means and the pilot valve, the hydraulic amplification means being responsive to the electrical control signals and being mechanically coupled to the pilot valve for enhancing the force applied to the valve spool in response to said electrical signals.

* * * * *